April 25, 1961 C. BLACK 2,981,661
EXTRACTIVE DISTILLATION OF AROMATIC COMPOUNDS
Filed May 5, 1958
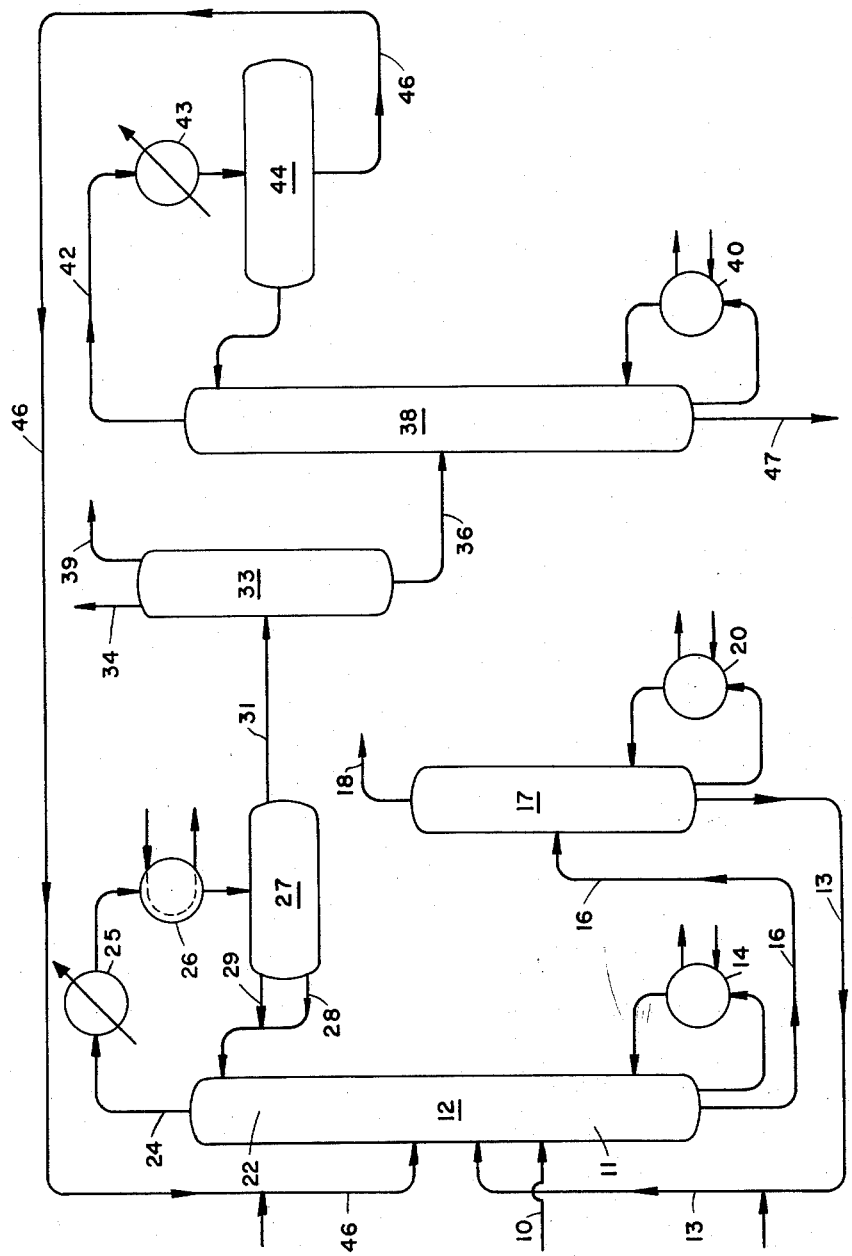
INVENTOR:
CLINE BLACK
BY: J. Reid Anderson
HIS ATTORNEY

United States Patent Office 2,981,661
Patented Apr. 25, 1961

2,981,661
EXTRACTIVE DISTILLATION OF AROMATIC COMPOUNDS

Cline Black, Berkeley, Calif., assignor to Shell Oil Company, a corporation of Delaware
Filed May 5, 1958, Ser. No. 732,951
6 Claims. (Cl. 202—39.5)

This invention relates to extractive distillation of toluene from a hydrocarbon mixture utilizing phenol as the solvent. The process of the invention is particularly suitable for the separation of toluene from close boiling mixtures which contain a material or materials that normally azeotrope with the phenol, thereby causing some phenol loss in the raffinate passing overhead from the extractive distillation zone. The improved process of the invention may be operated to reduce significantly or substantially forestall the loss of phenol in the raffinate.

Toluene, a chemical formerly obtained principally from the coal tar industry, has been in recent years recovered in increasingly larger amounts from petroleum derived streams, such as reformed naphthas. These petroleum streams contain hydrocarbon compounds whose normal volatilities are approximately the same as the aromatic materials being recovered and for this reason the separation of the toluene cannot be satisfactorily achieved through conventional fractional distillation. Hence, it has been necessary to resort to the more costly process of extractive distillation in an attempt to obtain efficient separation of the aromatic from the close boiling components of the hydrocarbon mixtures. The principal extractive distillation solvent used for the separation is phenol. Unfortunately, it has not been possible generally to operate the extractive distillations without some phenol loss occurring overhead in the raffinate stream. In order to remedy the situation, the raffinate has been passed through a knock-back or rectification section for the purpose of removing the phenol from the raffinate. The knock-back section is normally placed above the extractive distillation zone within the same column. However, even this approach has not been wholly successful since nearly all of the toluene enriched feed streams carry a material or materials which azeotrope with the phenol. For example, feed stocks suitable for toluene extraction inevitably carry some $C_8$ saturated hydrocarbons and if the higher boiling components of these materials are present in any significant amount, the phenol cannot be completely separated from the raffinate stream through simple rectification. It has been suggested that a better prefractionation to furnish a more narrower cut of the feed stock to the extractive distillation zone, eliminating the higher boiling $C_8$ saturated hydrocarbons, would correct the situation. However, this is not the complete answer since nearly all of the $C_8$ paraffins with the exception of 2,2,4-trimethyl pentane and n-octane azeotrope with the toluene and hence, prefractionation to remove the $C_8$'s without significant loss of toluene is clearly impractical if not impossible. Additionally, it has been generally experienced that the phenol loss is aggravated if the extractive distillation column is operated to obtain a high recovery of toluene. For the foregoing reasons, it has been necessary to compromise between minimum phenol loss and maximum toluene recovery in the operation of toluene extractive distillation systems.

It is an object of the present invention to provide an improved extractive distillation method for the recovery of toluene with a significant reduction or a substantial elimination of phenol losses.

Another object of the present invention is to provide an improved extractive distillation process utilizing phenol as a solvent which permits an economically-feasible high recovery of the aromatic materials. These and other objects and advantages will become apparent from the description of the invention which will be made with reference in part to the accompanying drawing wherein the sole figure is a schematic diagram of a preferred system for performing the process.

It has now been discovered that in an extractive distillation process using phenol as the solvent for the recovery of toluene from hydrocarbon feed mixtures containing a compound or compounds which normally azeotrope with the phenol solvent that the loss of phenol escaping overhead in the raffinate from the process can be significantly reduced or substantially prevented by directing the raffinate through a rectification zone in which liquid methanol is maintained on at least some of the plates in amounts adequate to reduce significantly the volatility of the phenol relative to its normal azeotrope formers. The presence of the methanol results in a more complete rectification of the phenol from the raffinate and permits the withdrawal of the raffinate from the rectification zone with a significantly reduced phenol content relative to that experienced in the absence of the methanol.

In a preferred embodiment of the process of the invention the vapor from the rectification zone, which is made up principally of raffinate non-toluene hydrocarbons and methanol is condensed to obtain a methanol phase and a hydrocarbon phase. Each of these two liquid phases contains some of the major component of the other phase. The methanol phase, containing up to 35% by weight dissolved hydrocarbon at 100° F., makes an excellent reflux and is preferably returned to the top of the rectification zone for this purpose. It may be desirable in some instances to return a portion of the hydrocarbon phase as well to fulfill the reflux requirement. The methanol in the hydrocarbon phase is separated from the hydrocarbon and recycled preferably to a tray at a lower level of the rectification zone. The methanol will normally make up less than 10% by weight of the hydrocarbon phase. Preferably the hydrocarbon phase is first subjected to a water washing to substantially free the raffinate hydrocarbon of the methanol. The distribution coefficient of methanol between the hydrocarbon and water is particularly favorable to such a separation and usually 0.15 to 0.30 volume of water per volume of the hydrocarbon phase is ample. The methanol containing wash water is then passed to a fractional distillation where the methanol is separated overhead and the water removed from the bottom of the distillation zone. The liquid methanol so recovered from the hydrocarbon phase is preferably recycled to the aforementioned lower level rectifying tray. By introducing the recycled methanol to a lower tray of the rectification zone it is possible to maintain liquid methanol in each succeeding tray above the tray of introduction, thus, reducing the volatility of the phenol and enhancing the volatility of its normal azeotrope formers in each of the trays and thereby facilitating the rectification of the phenol out of the raffinate. The methanol introduced to the rectification zone may be employed in varying amounts to alter the relative volatility of the phenol in the raffinate. However, as is apparent, the methanol should be used in amounts adequate to substantially reduce or forestall loss of the phenol in the overhead raffinate stream, and generally speaking it is recommended that the methanol be used in a quantity within the range of about 0.3 to 1.5 volumes of methanol per volume of hydrocarbon withdrawn as the overhead product (raffinate). Preferably, the methanol is admitted to the rectification zone in an amount of about 0.7 volume of methanol per volume of raffinate.

The process of the invention may be used to recover toluene from suitable feed stocks including prefractionated feed stocks of a wider hydrocarbon range than those used in present practice. Preferably, the feed stock is a prefractionated reformed naphtha stream, such as a straight run naphtha which has been reformed over a platinum catalyst to increase its aromatic content. A desirable feed stock will have, for example, a boiling range of 155–275° F. and preferably a more limited range of say 180° F. to about 260° F. if the toluene is to be substantially free of $C_8$ aromatics. With a prefractionated naphtha stream including material up to 275° F., any of the $C_8$ aromatics present will also be recovered with the toluene. In the conventional manner of processing, extending of the upper limit to temperatures above about 250° F. leads to excessive loss of phenol in the overhead raffinate. The present process is not limited in this respect and as a consequence a prefractionation to prepare the feed can be carried out for optimum recovery of toluene.

Historically, extractive distillation processes for the recovery of toluene have been operated with a pressure at the top of the knock-back section in the range of about 18–20 p.s.i.g. with a temperature at the top of the tower of about 220–230° F. If the same operating pressure range is used in the improved process of the invention, it is necessary to maintain the raffinate condenser at a somewhat reduced pressure to facilitate condensation of the overhead product (the raffinate and methanol). The condensing surface will have a temperature around say 140–150° F. depending upon the composition make-up of the raffinate, the methanol to raffinate ratio, pressure, etc. Operating at the usual pressure of about 18 p.s.i.g., using water-free methanol requires in addition that the condensate be subcooled to about 100° F. in order to provide two liquid phases. If desired, a single heat transfer surface could be used for both the condensing and subcooling. The lower temperature results in a better distribution coefficient in a subsequent water washing step, reducing the amount of water required to separate the methanol from the hydrocarbon. Alternatively, the leaving of some water in the raffinate condensate facilitates phase separation and obviates or lessens the need to subcool the condensate. A good phase separation is beneficial to the process as it results in less methanol in the hydrocarbon phase and considerably less hydrocarbon in the methanol phase. A low methanol content in the hydrocarbon phase further reduces the amount of water required for recovering the methanol. In the event water is utilized to further the phase separation of the overhead condensate, it is important that the amount of water utilized be held down below about 90% volume and preferably not to exceed 20% volume of the methanol. The water used for promoting phase separation may be injected directly into the condensate or the methanol recovery column (employed to separate the methanol from the process wash water) may be operated to leave some water in the recycled methanol.

Packed towers employing Raschig rings and other packings may be used for the tray column. However, packed columns are not widely used in the industry principally because of the tendency for the liquid to channel and drain down along the walls rather than through the packing. The term tray or plate tower is used generically herein to include packed towers.

Referring to the drawing a prefractionated reformed naphtha containing approximately 43% $C_7$ paraffins and around 48.5% toluene is passed via a line 10 to a lower section 11 of an extractive distillation column 12. The $C_7$ paraffins are mainly 2-methylhexane, 3-methyl hexane and normal heptane. The stream also contains approximately 3% of $C_8$ paraffins and other minor amounts of cyclopentanes and cyclohexanes. The boiling range of the mixtures extends from approximately 155° F. to 260° F. The feed stream is introduced either as a vapor or a liquid at just below its boiling point. Phenol in a solvent: feed ratio of 3:1 enters the column adjacent to the top of the extractive distillation zone through a line 13. The solvent to feed ratio may vary somewhat from the preceding ratio but most toluene extractive distillations will generally be in the range of 2.5–5 parts of solvent to 1 part of feed on a volume basis. The heat required for the operation of the column is supplied by a reboiler 14 and the tower is maintained at a pressure of about 18–20 p.s.i.g.

The descending solvent extracts the toluene from the feed stock and is removed in a solvent extract phase from the base of the tower via a line 16 and is passed to a conventional solvent stripper 17. The conditions of operation of the stripper are conventional and the product toluene is withdrawn overhead from the stripper in a line 18. The heat necessary for the operation of the stripper is supplied by a reboiler 20. The stripped solvent free of the toluene is returned to the extractive distillation column through the line 13.

The raffinate from the extractive distillation zone 11 of the column passes upwardly into an overlying rectification or knock-back zone 22 which constitutes the upper portions of the column. This zone is provided with several plates, for example, 10 or so, the actual number depending on the usual design factors such as amount of reflux, the ratio of methanol to raffinate, the raffinate composition and other usual design factors. The raffinate from the underlying extractive distillation zone of the column contains some phenol and due to the presence of the azeotrope formers, the several plates of the rectification section are (in the absence of methanol) unable to separate it adequately from the raffinate. In order to accomplish this separation, methanol is introduced to a lower level of the rectification zone, preferably, at a level which is a few trays removed from the top of the extractive distillation zone; thus, providing trays for the stripping of the methanol out of the downwardly moving liquid from the rectification zone. By recyling the methanol to this lower level of the zone, liquid methanol will appear on each succeeding tray above the point of introduction, thus, assuring reduced volatility of the phenol and enhanced volatility of its normal azeotrope formers on each of the trays. Depending upon the conditions of the operation, the relative amount of methanol used and the design of the extractive distillation zone, it becomes possible either to reduce significantly the phenol content of the raffinate or to substantially forestall the loss of any phenol in the raffinate. Phenol losses in the range of 0.2 to 0.7% based on the weight of the raffinate are commonly experienced in the absence of the use of methanol in a conventional extractive distillation of toluene.

The raffinate now substantially free of phenol leaves the top of the rectification zone in a line 24, passes to a condenser 25 where the vapor is cooled and the condensate is subcooled in the cooler 26 and is then collected in a separator-receiver 27. The cooling surface of the condenser is preferably maintained at about 145° F. and the subcooler at about 100° F. The condensate separates into a predominately hydrocarbon phase and a predominately methanol phase. The former phase contains about 8% w. methanol, the rest hydrocarbon and the latter phase about 35% w. hydrocarbon and the rest methanol. The phase containing a high proportion of methanol makes a particularly desirable reflux for the operation and is returned via a line 28 to the top tray of the rectification zone of the column. It may be desirable depending on the reflux requirements of the particular column to provide additional liquid and in that event a portion of the overlying hydrocarbon phase is returned via line 29 as reflux. The rest of the hydrocarbon phase is moved through a line 31 to a water washing tower 33 where it flows countercurrently to a stream of water introduced in a line 34. The water is used in an amount of about 0.2 volume per volume of the hydrocarbon phase. Substantially all the methanol transfers to the water phase and is removed via a line 36 to a wash water fractionating tower 38. The water-washed raffinate leaves the washing tower in a line 39. The fractionating tower is supplied with heat by a reboiler 40 and there the wash water is distilled to separate methanol vapors overhead via a line 42 which opens into a condenser 43. The methanol condensate collects in a receiver 44 and is recycled via a line 46 to the aforementioned tray at the lower level of the rectification zone of the column. Water is removed in a line 47 from the bottom of the tower.

Methanol is particularly well suited to the function it serves in the process, since it not only provides favorable relative volatilities on the trays of the knock-back section for rectifying back phenol, but with the overhead hydrocarbon of the raffinate it separates into two phases on condensing and cooling, providing a methanol phase and a hydrocarbon phase. The methanol phase makes an excellent reflux to the knock-back section, while the hydrocarbon phase which has a relatively low methanol concentration may be readily freed of its methanol in a water wash column. Since methanol has a high distribution coefficient into the water phase, relatively small quantities of water are needed to recover it from the hydrocarbon of the raffinate. Another advantage in the use of methanol is that it easily separates from the wash water in an ordinary distillation column.

I claim as my invention:

1. In an extractive distillation process using phenol as the solvent for the recovery of toluene from a hydrocarbon feed containing a compound which normally azeotropes with the phenol solvent, thereby causing some of the phenol to escape overhead with the raffinate and wherein there is provided a rectification zone having a number of liquid carrying plates beyond the extractive distillation zone to further the separation of the solvent from the raffinate, the improvement comprising maintaining methanol in the liquid of at least some of the trays of the rectification zone in amounts adequate to reduce significantly the volatility of the phenol relative to its normal azeotrope former without the formation of an azeotropic mixture between the phenol solvent and said methanol, thereby permitting a substantially more complete rectification of the phenol from the raffinate and withdrawing methanol and the raffinate from the rectification zone, said raffinate having a significantly reduced phenol content relative to that experienced in the absence of the methanol.

2. In an extractive distillation process employing phenol as the solvent for the extraction of toluene from a hydrocarbon feed containing a component which normally azeotropes with the phenol solvent, thereby resulting in the loss of some of the phenol overhead with the raffinate and wherein there is provided a rectification zone having several liquid carrying trays to further separation of the solvent from the raffinate, the improvement comprising maintaining methanol in the liquid of at least some of the trays of the rectification zone in amounts adequate to reduce appreciably the volatility of the phenol relative to its azeotrope formers, thereby permitting a more complete rectification of the phenol from the raffinate, said methanol being further characterized by its inability to form an azeotrope with phenol, withdrawing a vapor phase made up principally of non-toluene hydrocarbons and methanol, condensing said vapor to obtain a methanol phase and a hydrocarbon phase, each of said phases containing some of the major component of the other liquid phase, and returning the methanol phase to the rectification zone.

3. In an extractive distillation process using phenol as the solvent for the extraction of toluene from a hydrocarbon feed containing a material which normally tends to azeotrope with the phenol, thereby resulting in the loss of some of the phenol solvent overhead with a gaseous raffinate and wherein there is provided a rectification zone having several liquid carrying trays to further separation of the phenol and raffinate, the improvement comprising maintaining methanol in the liquid of at least some of the trays of the rectification zone in amounts adequate to reduce significantly the volatility of the phenol and to enhance the volatility of its normal azeotrope formers, thereby permitting a substantially more complete rectification of the phenol and raffinate, said methanol being further characterized by its inability to form an azeotrope with phenol, withdrawing a vapor phase made up of principally raffinate non-toluene hydrocarbons and methanol, condensing said vapor phase to obtain a methanol phase and a hydrocarbon phase, each of said phases containing some of the major component of the other liquid phase, and returning the methanol phase to the rectification zone.

4. A process in accordance with claim 3 wherein the methanol is returned to the rectification zone in an amount of 0.2 to 1.5 volumes of methanol per volume of raffinate.

5. In an extractive distillation process using phenol as the solvent for the extraction of toluene from a hydrocarbon feed containing a hydrocarbon which normally tends to azeotrope with the phenol, thereby resulting in the loss of some of the phenol solvent overhead with the raffinate and wherein there is provided a rectification zone having several liquid carrying trays to further separation of the phenol and raffinate, the improvement comprising maintaining methanol in the liquid of at least some of the trays of the rectification zone in amounts adequate to reduce significantly the volatility of the phenol and to enhance the volatility of its normal azeotrope formers, thereby permitting a substantially more complete rectification of the phenol and raffinate, withdrawing a vapor phase made up of raffinate non-toluene hydrocarbons and methanol, condensing said vapor phase to obtain a methanol phase and a hydrocarbon phase, each of said phases containing some of the major component of the liquid phase, returning the methanol phase to a top section of the rectification zone, separating the methanol from the hydrocarbon of said hydrocarbon phase and returning the so separated methanol to a tray at a lower level of the rectification zone.

6. In an extractive distillation process using phenol as the solvent for the extraction of toluene from a hydrocarbon feed containing a material which normally tends to azeotrope with the phenol, thereby resulting in the loss of some of the phenol solvent overhead with the raffinate and wherein there is provided a rectification zone having several liquid carrying trays to further separation of the phenol and raffinate, the improvement comprising maintaining methanol in the liquid of at least some of the trays of the rectification zone in amounts adequate to reduce significantly the volatility of the phenol and to enhance the volatility of its normal azeotrope formers, thereby permitting a substantially more complete rectification of the phenol and raffinate, withdrawing a vapor phase made up principally of raffinate non-toluene hydrocarbons and methanol, condensing said vapor phase to obtain a methanol phase and a hydrocarbon phase, each of said phases containing some of the major component of the other liquid phase, returning the methanol phase to a top section of the rectification zone, water washing the hydrocarbon phase to substantially free the raffinate hydrocarbon of methanol, fractionally distilling the wash water to separate the methanol therefrom and recycling the distilled methanol to a tray at a lower level of the rectification zone.

References Cited in the file of this patent

UNITED STATES PATENTS

| 1,960,461 | Stratford | May 29, 1934 |
|---|---|---|
| 2,128,958 | Muller-Conradi | Sept. 6, 1938 |
| 2,215,359 | Livington et al. | Sept. 17, 1940 |
| 2,406,695 | Lake | Aug. 27, 1946 |
| 2,520,006 | Hibshman | Aug. 22, 1950 |